United States Patent [19]
Kubo et al.

[11] Patent Number: 4,945,403
[45] Date of Patent: Jul. 31, 1990

[54] COLOR TELEVISION FORMAT USING PULSE FREQUENCY AND PULSE WIDTH MODULATION

[75] Inventors: Kiyoshi Kubo, Katano; Noboru Okamura, Kadoma; Susumu Morikura, Hirakata, all of Japan

[73] Assignee: Matsushita Electric Industrial Co., Ltd., Osaka, Japan

[21] Appl. No.: 289,825

[22] Filed: Dec. 27, 1988

[30] Foreign Application Priority Data

Jan. 25, 1988 [JP] Japan .................................. 63-13885

[51] Int. Cl.$^5$ ..................... H04N 11/04; H04N 11/00
[52] U.S. Cl. ..................................... 358/13; 358/145; 358/147
[58] Field of Search ..................... 358/12, 13, 145, 147

[56] References Cited
U.S. PATENT DOCUMENTS
4,675,721 6/1987 Dirr ......................................... 358/13

OTHER PUBLICATIONS

Mitiaki Miyazono et al., 2-channel picture transmission examination in pulse interval & width modulation method, The Institute of Electronics and Communication Engineers of Japan etc., p. G226, 1982.

*Primary Examiner*—John W. Shepperd
*Attorney, Agent, or Firm*—Stevens, Davis, Miller & Mosher

[57] ABSTRACT

A luminance signal in a component video signal is pulse frequency modulated, and the pulse frequency modulated signal is sequentially pulse width modulated by two color difference signals alternately. Thus, the component video signal is transmitted as one pulse train signal efficiently without extending the transmission band widely. A sound signal and a data signal can also be transmitted as digital signal in the one pulse train signal. The luminance signal and two color difference signals may also be inverted line-by-line prior to being modulated.

15 Claims, 9 Drawing Sheets

COLOR TELEVISION FORMAT USING PULSE FREQUENCY AND PULSE WIDTH MODULATION

BACKGROUND OF THE INVENTION

The present invention relates to a method and system for a signal transmission for transmitting a component video signal, a sound signal, and a data signal through, in particular, a single core optical fiber.

In order to transmit a component video signal through a single core optical fiber, one of the following methods, that is, a frequency multiplex method in which respective signals are frequency multiplexed after the signals have been modulated by different frequencies, or a PCM multiplex method in which respective signals are multiplexed after the signals have been PCM encoded, or a wavelength multiplex method in which respective signals are transmitted to a light emitting device by using three different wavelengths has been employed.

FIGS. 1A to 1D show block diagrams of transmitter sections of these methods.

FIG. 1A shows the frequency multiplex method. A luminance signal (hereinafter referred to Y, or a Y signal) and two color difference signals (referred to as Pr or a Pr signal, and Pb or a Pb signal respectively) are respectively modulated by three different frequencies f0, f1, and f2 in modulators 100, 101, and 102, and then the modulated signals are frequency multiplexed by a multiplexer 103. The frequency multiplexed signal is converted to an optical signal by an electro-optic converter (hereinafter, referred to as an E.O) 104, and delivered to an optical fiber. As a typical one of such a multiplexer, there is a component/composite signal converter. When a wide band, high definition color television signal (hereinafter, referred to as a HDTV signal) is to be transmitted by this method, a light emitting device having a wide band and satisfactory linearity is required as the E/O 104, and the selection of the light emitting device is difficult.

In FIG. 1B, a pulse modulater 114 is connected between the output of the multiplexer 103 and the E/O 115. As the pulse modulater 114, there are a pulse frequency modulater, a pulse width modulater, and the like. In this method, although the linearity of an E/O 115 is not required, the pulse modulater 114 having a wide band and satisfactory linearity is required.

FIG. 1C shows the PCM multiplex method. The Y, Pr, and Pb signals are respectively converted to digital signals by PCM encoders 105, 106, and 107. These three digital signals are time division multiplexed by a multiplex section 108. The time division multiplexed signal is converted to an optical signal by an E/O 109, and delivered to an optical fiber. The transmission speed of the E/O 109 is equal to several hundreds of M bps or larger. In this method, the scale of the system is large and the cost is high, and furthermore, the optical fiber for a transmission line is required to be of very wide band.

FIG. 1D shows the wavelength multiplex method. The Y, Pr, and Pb signals are respectively inputted to E/O's 110, 111, and 112 including light emitting devices which have wavelengths of respectively λ1, λ2, and λ3, and the inputted signals are converted to optical signals. These optical signals are multiplexed by an optical combiner 113, and delivered to an optical fiber. This method requires many kinds of light emitting devices, and optical equipment including optical combining and branching devices, etc. Furthermore, the velocities of propagation of the optical signals having wavelengths of λ1, λ2, and λ3 in the optical fiber differ from one another because of a difference in refractive index due to the wavelengths of the light emitting devices. Accordingly, a drawback is involved in that a relative phase of the signals is different depending on the transmission distance, and the correction thereof is difficult.

As described above, the related arts are methods involve the above-mentioned drawbacks respectively in transmitting the component signal having a wide band, in particular, such as a HDTV signal.

SUMMARY OF THE INVENTION

It is an object of the present invention to provide a method and system for transmission of a component video signal in which the linearity of the light emitting device and the wide band characteristic of the modulater are not required which are required in the frequency multiplex method, the high speed processing is not required which is required in the PCM multiplex method, and furthermore, the component video signal can be transmitted optically with one light emitting device.

Another object of the present invention is to provide a method and system for transmission of a signal, which are capable of transmitting a digital signal and a data signal in addition to a component video signal.

In order to achieve the above objects, in a signal transmission method in the present invention, a luminance signal in a component video signal which includes the luminance signal and two color difference signals is subjected to a pulse frequency modulation (PFM), and the pulse frequency modulated signal is sequentially pulse width modulated by the two color difference signals alternately to form one pulse train signal thereby to transmit the component video signal.

Furthermore, in the present invention, during a part of horizontal blanking period or a vertical blanking period of the component video signal, the above-mentioned pulse frequency modulated signal is binary pulse width modulated by a data signal compressed with respect to a time base, a digital sound signal compressed with respect to the time base, and an identification signal indicating positions of the data signal and the digital sound signal, thereby to form one pulse train signal, and the component video signal, the data signal, and the sound signal are transmitted.

Furthermore, in the present invention, the one pulse train signal is subjected to signal processing to amplify after the one pulse train signal is differentiated upon receiving the same, and a gain of the amplified signal is controlled automatically, and the component video signal, the data signal, and the sound signal are demodulated.

As described above, in the present invention, the luminance signal of a component video signal is carried on a pulse interval, and the above carried luminance signal is alternately pulse width modulated by two color difference signals, and the pulse width modulated signal is binary pulse width modulated by the data signal, digital sound signal, and identification signal indicating the positions of these signals. As a result, it is possible to identify the two color difference signals, and to transmit the video, sound, and data signals in one pulse train efficiently without extending the transmission band to a great extent. For this reason, the high speed processing section used in the PCM multiplex system is not required, and the modulater having a wide band used in the frequency multiplex system is not necessary. Moreover, since one pulse train signal is employed, only one E/O is required in the optical transmission. Furthermore, since pulse transmission is used, the problem of linearity of the light emitting device does not arise. In addition, by differentiating the received signal at its minute signal condition at the time of reception, it makes easy the amplification at a later stage, and the gain control can be performed accurately. Furthermore, by differentiating at the time of reception, the received signal can be separated into a luminance component and a color difference signal component easily. Furthermore, before the demodulation of the color difference signals, by making constant the pulse width of the binary pulse width modulated signal, in which the identification signal, data signal, and digital sound signal are binary pulse width modulated in the horizontal blanking period or the vertical blanking period, it is possible to eliminate the influence of the binary PWM signal components of these identification signal, data signal, and digital sound signal on the clamp period and video signal period during demodulation of the color difference signals. As a result, the reproduction of the color difference signals can be achieved satisfactory. The present invention provides, as described above, a very efficient method and system for transmission of a HDTV signal.

DESCRIPTION OF THE PREFERRED EMBODIMENT

A first embodiment of invention will be described with reference to FIGS. 2 and 3.

Figure 1A:
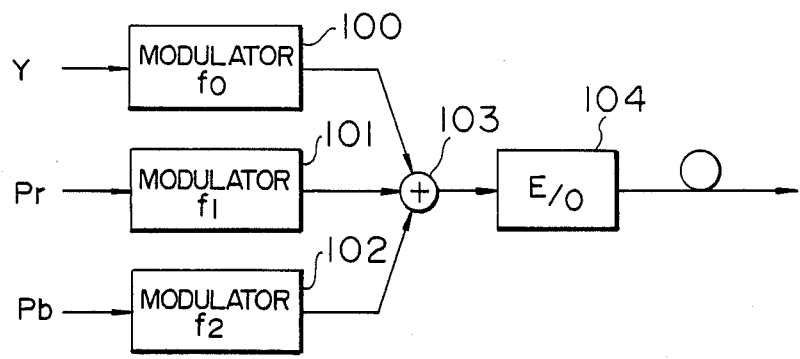
FIGS. 1A to 1D are respectively block diagrams showing related art examples.
Figure 1B:
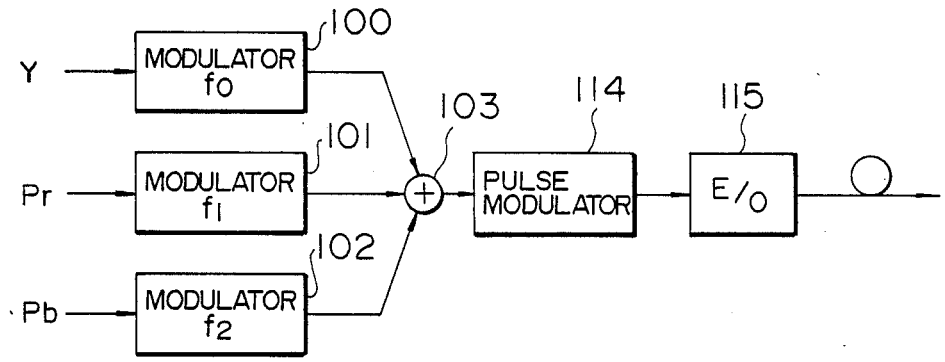
Figure 1C:
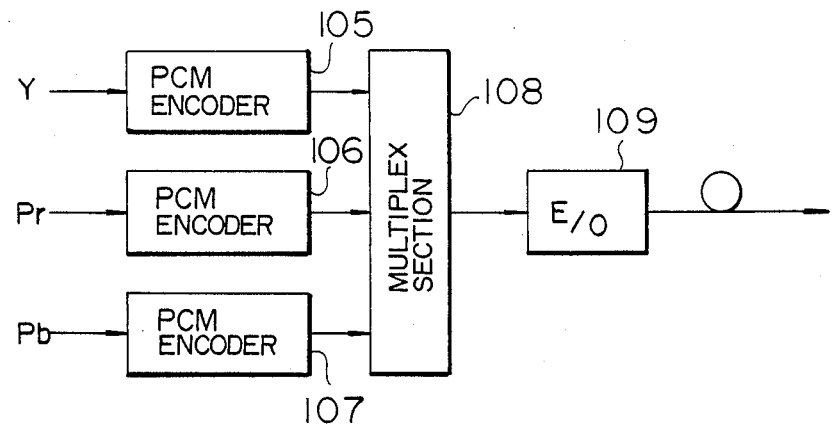
Figure 1D:
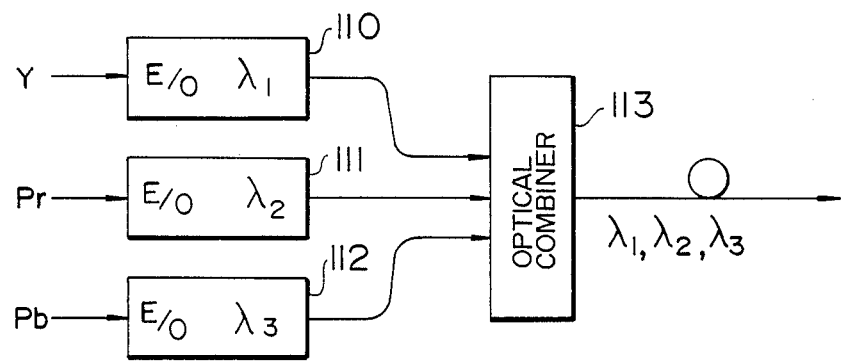
Figure 2:
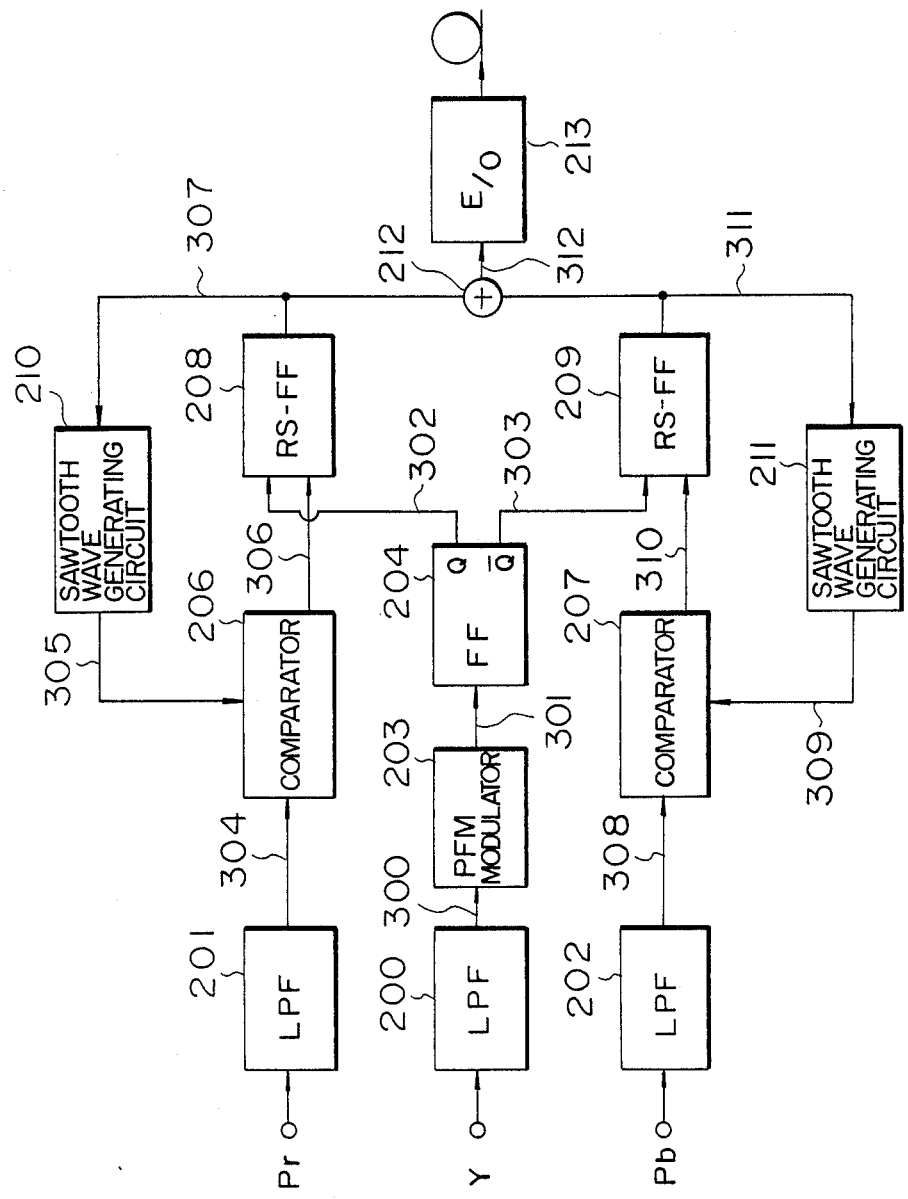
FIG. 2 is a block diagram showing an embodiment of the present invention.
Figure 3:
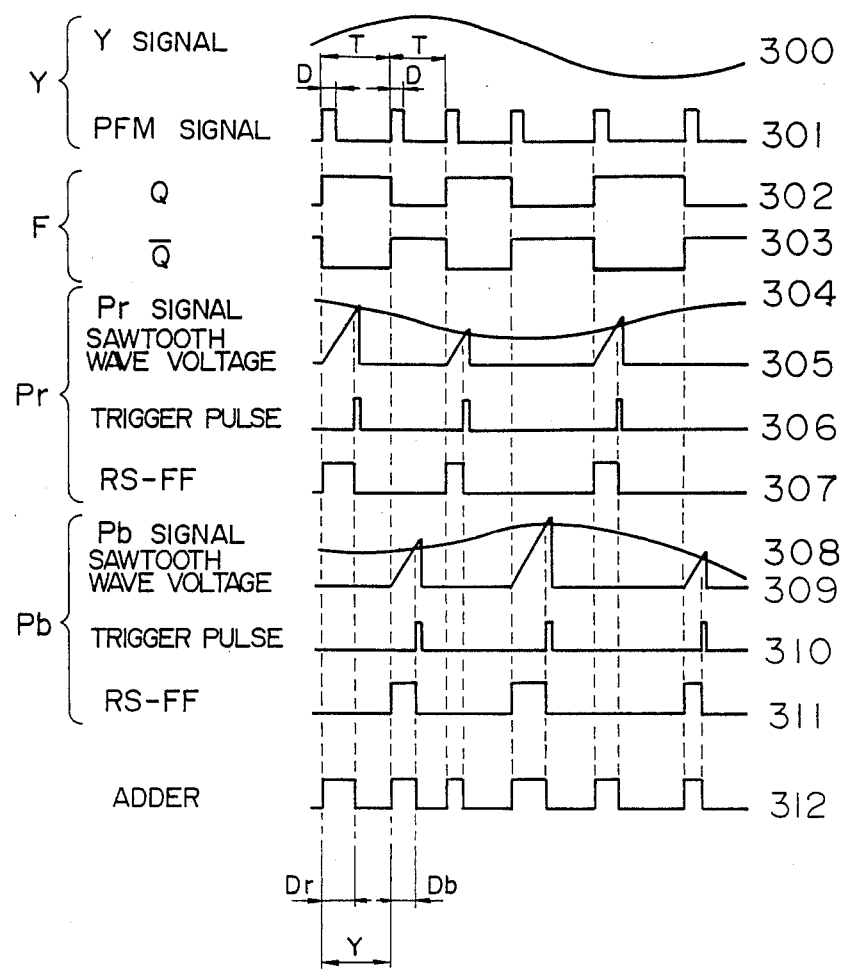
FIG. 3 is a waveform diagram for explaining operation of various parts in the embodiment of FIG. 2.

In FIG. 2, Y, Pr, and Pb signals in a component video signal are respectively inputted to low-pass filters (hereinafter, referred to as LPF) 200, 201, and 202. These LPF's 200 to 202 eliminate undesired high frequency components.

The Y signal 300 passed through the LPF 200 is inputted to a PFM modulater (pulse frequency modulater) 203 and converted to a PFM (pulse frequency modulation) signal 301 which has a constant pulse width D and a pulse interval T varied according to a signal amplitude of the Y signal. The waveforms of the input and output signals of the PFM modulater 203 are shown at 300 and 301 in FIG. 3.

This PFM signal 301 is inputted to a flip-flop (hereinafter, referred to as a FF) 204. The FF 204 divides a frequency of the PFM signal 301 to ½ (a half), and produces two signals including Q signal 302 and $\overline{Q}$ signal 303 of 180 degrees out of phase. FIG. 3 shows, at 302, 303, and 301, the relationships among waveforms of the two signals Q and $\overline{Q}$ signals and the PFM signal. The Q signal 302 and $\overline{Q}$ signal 303 which are output signals of the FF 204 are respectively inputted to set terminals of RS-FF's 208 and 209.

On the other hand, the Pr signal is inputted to a comparator 206 through the LPF 201. The comparator 206 compares a signal amplitude 304 of the output signal of the LPF 201 with a sawtooth wave voltage 305 of the output signal of a sawtooth wave generating circuit 210, and outputs a trigger pulse 306 of a Hi level when the sawtooth wave voltage 305 is larger than the signal amplitude 304. The trigger pulse 306 outputted from the comparator 206 is inputted to a reset terminal of the RS-FF 208.

The RS-FF 208 is set by a leading edge of the output signal Q 302 of the FF 204 to produce a Hi level signal, and is reset by a leading edge of the trigger pulse 306 outputted from the comparator 206 to produce a Lo level signal. The output signal 307 of the RS-FF 208 is fed to the sawtooth wave generating circuit 210. The sawtooth wave generating circuit 210 generates a sawtooth voltage 305 which rises at a time point when the input signal becomes Hi level and returns to an initial value at Lo level of the input signal. Accordingly, a period between the set and the reset of the output signal 307 of the RS-FF 208 is changed depending on the signal amplitude of the Pr signal. Thus, a trailing edge of the RS-FF 208 is pulse width modulated by the Pr signal on the basis of a leading edge of the output signal 301 of the PFM modulater 203.

Similarly, the Pb signal is inputted to a comparator 207 through the LPF 202. The comparator 207 compares a signal amplitude 308 of the output signal of the LPF 202 with a sawtooth voltage 309 of the output signal of a sawtooth wave generating circuit 211, and delivers a trigger pulse 310 of a Hi level when the sawtooth voltage 309 is larger than the signal amplitude 308 of the output signal of the LPF 202. The trigger pulse 310 outputted from the comparator 207 is fed to a reset terminal of the FF 209.

The RS-FF 209 is set by a leading edge of the output signal $\overline{Q}$ 303 to produce a Hi level signal, and is reset by a leading edge of the trigger pulse 310 outputted from the comparator 207 to produce a Lo level signal. The output signal 311 of the RS-FF 209 is fed to a the sawtooth wave generating circuit 211. The sawtooth wave generating circuit 211 generates the sawtooth voltage 309 which rises at a time point when the input signal becomes Hi level and returns to an initial value at Lo level of the input signal. Accordingly, a period between the set and the reset of the output signal 311 of the RS-FF 209 is changed depending on the signal amplitude of the Pr signal. Thus, a trailing edge of the output signal 311 of the RS-FF 209 is pulse width modulator by the Pb signal on the basis of a leading edge of the output signal 301 of the PFM modulater 203.

The output signals 307 and 311 of the RS-FF's 208 and 209 having different phases are inputted to an adder 212 to be summed therein. The output signal 312 of the adder 212 is one pulse train signal. This one pulse train contains information of the Y signal in the pulse interval T, and information of the signals Pr and Pb in pulse widths Dr and Db alternately. The output signal 312 of the adder 212 is converted to an optical signal by an E/O 213, and delivered.

As described in the foregoing, in this system, due to the visual sensitivity characteristic, a color difference signal band of the video signal is sufficient if it has a half of the luminance signal band or smaller. Accordingly, the component video signal can be transmitted efficiently as one pulse train signal by carrying the luminance signal of the component video signal on the pulse interval, and by pulse width modulating the carried luminance signal by the two color difference signals alternately without extending the transmission band. Therefore, the high speed processing section used in the PCM multiplex system is not necessary, and the modulater of a wide band used in the frequency multiplex system is not necessary. Furthermore, since one pulse train signal is employed, only one E/O is required in the case of optical transmission. In addition, since pulse transmission is employed, the problem of linearity of the light emitting device is not involved. Therefore, the system in the above embodiment is very efficient in transmitting a HDTV signal.

Figure 4:
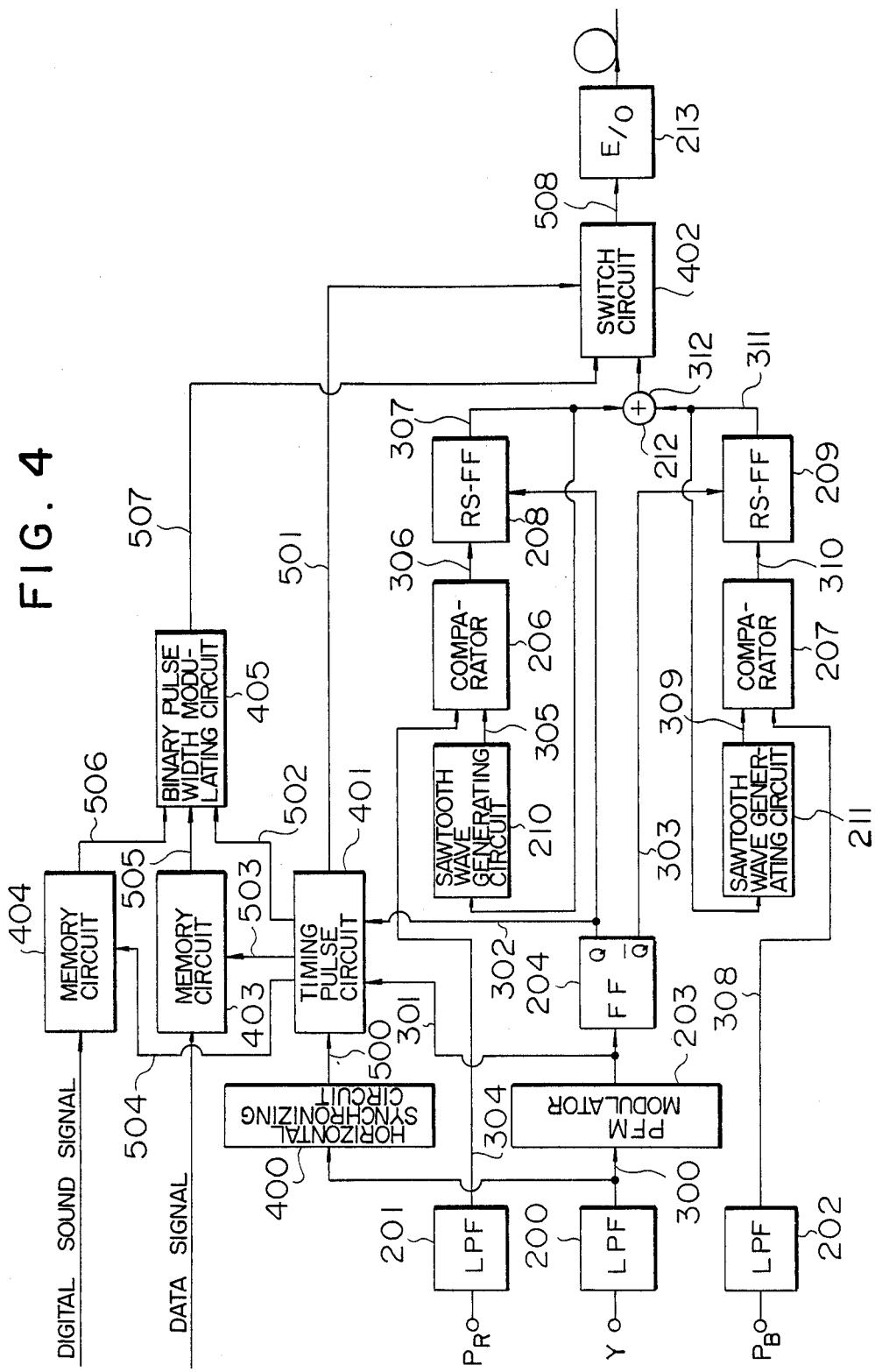
FIG. 4 is a block diagram showing a second embodiment of the present invention.
Figure 5:
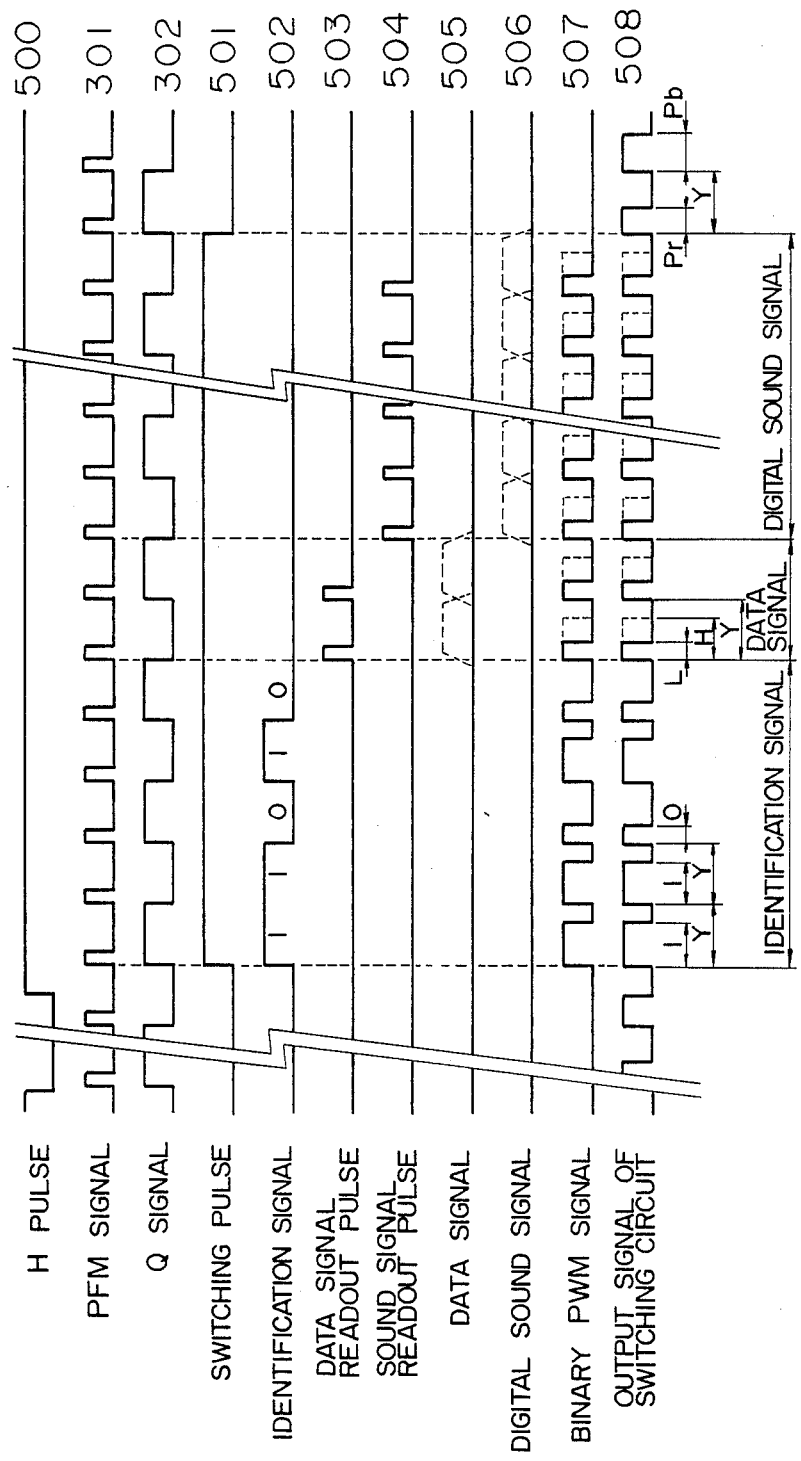
FIG. 5 is a waveform diagram for explaining operation of various parts in the embodiment of FIG. 4.

Next, a second embodiment will be described. In FIGS. 4 and 5, identical components with those in FIGS. 2 and 3 are designated by identical numerals, and explanations thereof are omitted.

A method of transmitting a sound signal and a data signal is illustrated in FIG. 4 as a block diagram, and in FIG. 5 as waveform diagram.

A horizontal synchronizing circuit 400 is supplied with a Y signal, and produces a horizontal synchronizing signal (hereinafter, referred to as an H pulse) 500 which rises at a starting position of a horizontal blanking period or a vertical blanking period, and is at a Hi level during the horizontal synchronizing period, and is repeated at a horizontal synchronizing period. The H pulse 500 is fed to a timing pulse circuit 401.

The timing pulse circuit 401 receives a PFM signal 301, a Q signal 302, and the H pulse 500, and generates a switching pulse 501, an identification signal 502 indicating positions of a data signal and digital sound signal, a data signal readout pulse 503, and a sound signal readout pulse 504.

The switching pulse 501 rises at timing synchronized with the PFM signal 301 after the rise of the H pulse 500, and falls at timing synchronized with the PFM signal 301 just after counting of the number of bits of the identification signal 502, the data signal, and the digital signal. The switching pulse 501 is fed to a switch circuit 402.

The identification signal 502 which indicates positions of the data signal and the digital sound signal is produced from the switching pulse 501 and the PFM SIGNAL 301. The identification signal 502 is generated in synchronism with the PFM signal 301 after the rise of the switching pulse 501, and indicates the positions of the data signal and the sound signal. Accordingly, a pattern of the identification signal 502 is arbitrary, and the number of bits of the identification signal 502 and the data signal and the digital sound signal may be any bit number so far as the Hi level period of the switching pulse 501 is within the horizontal blanking period. Here, it is supposed that the pattern of the identification signal 502 is "11010". The head bit of the pattern "11010" is outputted from the timing pulse circuit 401 during Hi level of the Q signal whose frequency is a ½ division of the frequency of the PFM signal 301.

The identification signal 502 outputted from the timing pulse generating circuit 401 is fed to a binary pulse width modulating circuit 405.

A data signal readout pulse 503 is generated just after the pattern "11010" of the identification signal 502 in synchronism with the PFM signal 301. The data signal readout pulse 503 is fed to a memory circuit 403.

A sound signal readout pulse 504 is generated just after the finish of the data signal readout pulse 503 in synchronism with the PFM signal 301. The sound signal readout pulse 504 is fed to a memory circuit 404.

Here, the number of the identification signal 502 and the data readout pulse 503 and the sound readout pulse 504 may be any number so far as a time period of the total number of these signals is within the horizontal blanking period.

On the other hand, the data signal and the digital sound signal are inputted respectively to the memory circuits 403 and 404. The data signal and the digital sound signal stored in these memory circuits 403 and 404 are respectively compressed with respect to the time base and read out by the data signal readout pulse 503 and the sound signal readout pulse 504, and fed to the binary pulse width modulation circuit 405. In FIG. 5, signal waveforms of the data signal and the digital sound signal inputted to the binary pulse width modulation circuit 405 are shown at 505 and 506. The identification signal 502, the data signal 505, and the digital sound signal 506 inputted to the binary pulse width modulation circuit 405 are converted to a binary PWM signal 507 on the basis of the leading edge of the PFM signal 301. In this respect, the leading edge contains information of the Y signal. The binary PWM signal 507 is fed to the switch circuit 402.

The switch circuit 402 outputs the binary PWM signal 507 outputted from the binary pulse width modulation circuit 405 when the switching pulse 501 is at a Hi level, and outputs the output signal 312 of the adder 212 when the switching pulse 501 is at a Lo level.

Here, as to the output signal 312 of the adder 212, in the period of Hi level of the switching pulse 501, five bits "11010" of the identification signal 502 from the Hi level of the Q signal is binary pulse width modulated, and furthermore, a certain number of bits of the data signal 505 and the digital sound signal 506 are binary pulse width modulated. When the switching pulse 501 becomes to Lo level, the color difference signals are pulse width modulated.

The number of bits (the number of pieces of data which are transmitted from the start of transmission of the identification signal 502 until the transmission of the data signal 505 and the digital sound signal 506 finishes is set to N, and a pulse width modulated signal which is to be transmitted just after the transmission of the identification signal 502, the data signal 505, and the digital sound signal 506 is set to be the Pr signal. By transmitting the identification signal 502, the data signal 505, and the digital sound signal 506 after setting in the above manner, in the receiving side, it is possible to identify the Pr signal and the Pb signal of the color difference signals by counting the above-mentioned bit number N.

The output signal of the switch circuit 402 is converted to an optical signal by the E/O 213 and delivered therefrom.

In this manner, the component video signal and the data signal and the sound signal can be transmitted as one pulse train signal.

As described in the foregoing, since the color difference signal band is sufficient if it is a half of the luminance signal band or smaller, the luminance signal of the component video signal is carried on the pulse interval, and the two color difference signals are alternately pulse width modulated at a half period of the pulse interval, and the data signal, the digital signal, and the identification signal indicating the positions of these signals are binary pulse width modulated in a part of the horizontal blanking period or the vertical blanking period of the component video signal. As a result, the identification of the two color difference signals is made possible, and the video, sound, and data signals can be transmitted as one pulse train efficiently without extending the transmission band. Therefore, the high speed processing section used in the PCM multiplex system is not necessary, and the modulater of a wide band used in the frequency multiplex system is not required. Furthermore, since one pulse train signal is employed, only one E/O is required in optical transmission. In addition, since pulse transmission is used, the problem of the linearity of the light emitting device does not arise. Thus, the system described above is very effective system in transmitting a HDTV signal.

Figure 6:
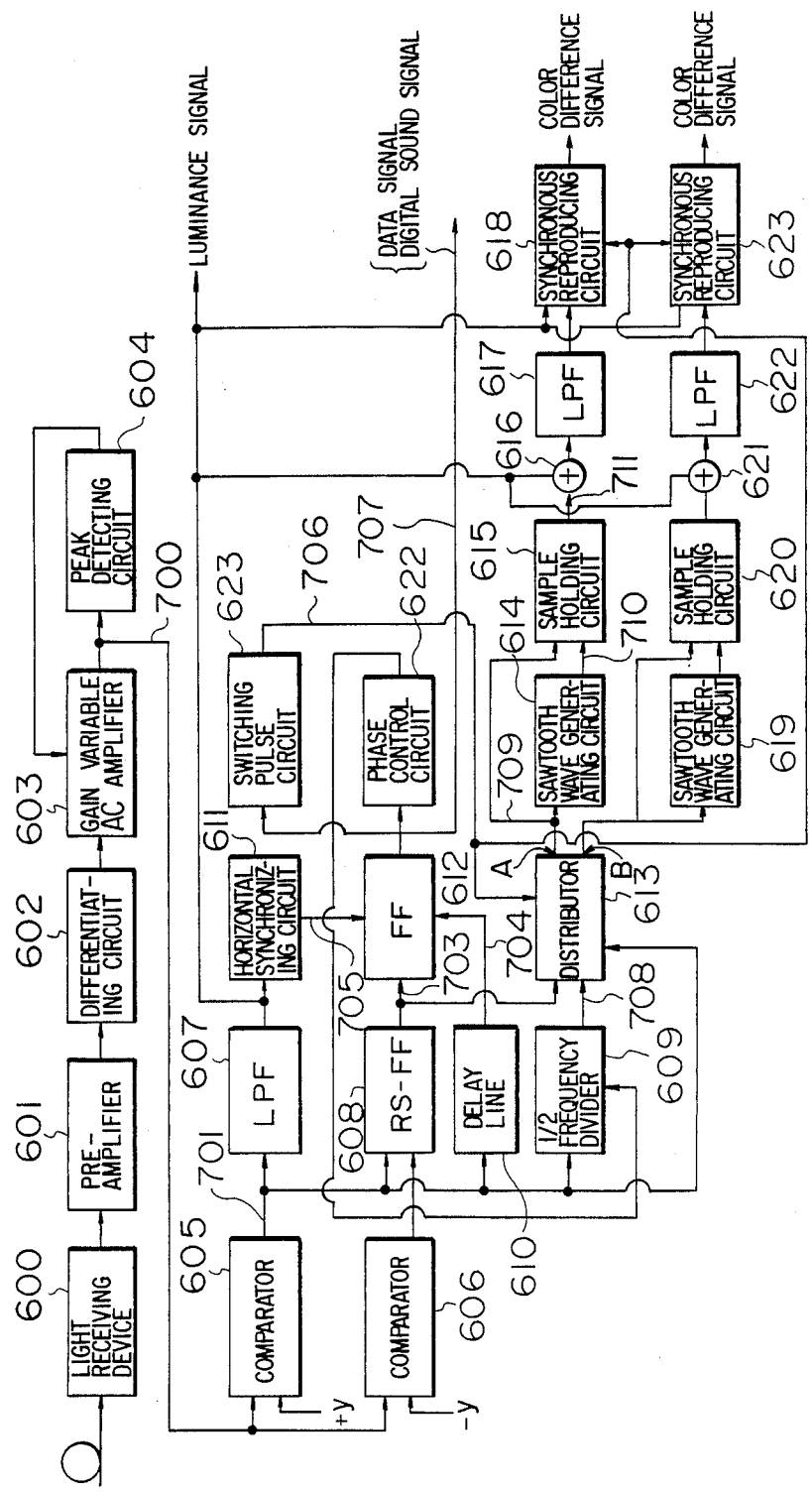
FIG. 6 is a block diagram showing a receiver used in the present invention.
Figure 7:
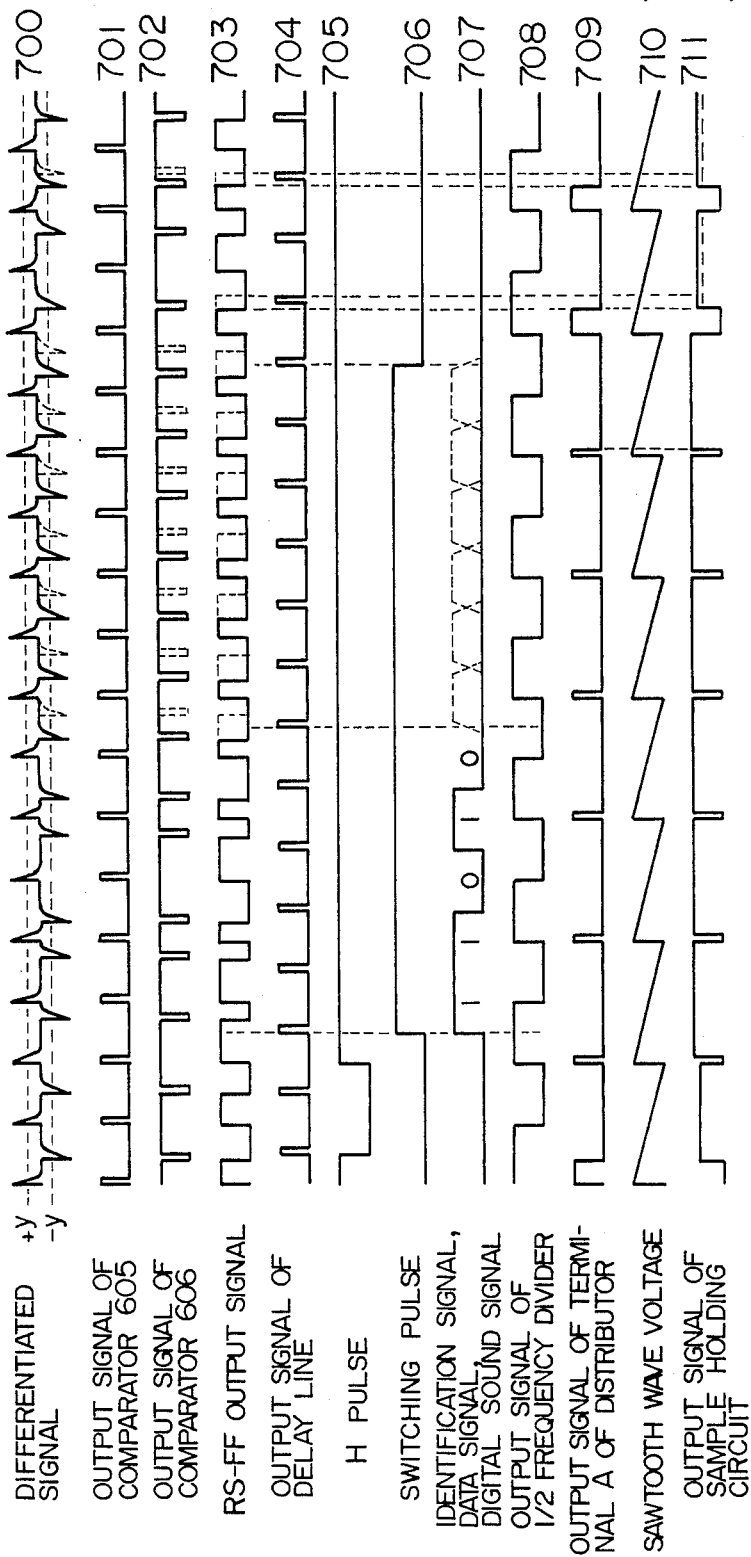
FIG. 7 is a waveform diagram for explaining operation of various parts in the embodiment of FIG. 6.

Next, a receiver of the invention will be described. With reference to FIGS. 6 and 7, a method for identification, at the time of reception, of a Pr signal and a Pb signal which have been pulse width modulated alternately, and a signal processing method will be described. The transmitted signals are the same as the second embodiment, and hence the explanation is omitted.

An optical signal inputted to a light receiving device 600 is converted to a current. The current is subjected to current-to-voltage conversion in a preamplifier 601. In the converted signal, there are contained frequency components ranging from a DC component to a high frequency component corresponding to a minimum pulse width of the PFM. Furthermore, since this voltage signal is a minute signal, it is necessary to amplify. However, it is difficult in realizing a circuit capable of amplifying the signals ranging from the DC component to the high frequency component by several tens of dB. In addition, since the DC level of this signals is changed depending on the signal amplitudes of the luminance signal and two color difference signals, the accuracy of peak detection is degraded, and it is difficult to control the gain accurately. Accordingly, the signal is differentiated by a differentiating circuit 602, and after removing the DC component, it is amplified by a gain variable AC amplifier 603.

A signal component whose level is higher than zero level of the differentiated signal is a leading component of the received pulse train, and thus, a luminance signal component is contained. On the other hand, a signal component whose level is lower than the zero level is a trailing component of the received pulse train, and thus, a color difference signal component is contained. A part of the color difference signal component within a part of the horizontal blanking period or the vertical blanking period contains the identification signal, digital sound signal, and data signal.

In this manner, by the differentiation, it is possible to easily separate into the luminance signal component and the color difference signal component.

The output 700 of the gain variable AC amplifier 603 is inputted to a peak detection circuit 604 and comparators 605 and 606.

The peak detection circuit 604 detects a signal amplitude of the output signal 700 of the gain variable AC amplifier 603, and controls the gain of the gain variable AC amplifier 603 by varying the gain so that the output signal 700 thereof becomes constant. By amplifying after differentiation, the peak detection can be performed accurately since the DC component is not changed depending on the luminance signal and the color difference signals, and it is possible to perform the gain control easily and accurately.

The comparator 605 identifies the output signal of the gain variable AC amplifier 603 using as a threshold value a DC level ($+y$) which is higher than the zero level of the output signal of the gain variable AC amplifier 603. Similarly, the comparator 606 identifies the output signal of the gain variable AC amplifier 603 using as a threshold value a DC level ($-y$) which is lower than the zero level of the output signal of the gain variable AC amplifier 603.

The output signal 701 of the comparator 605 is inputted to an LPF 607, a set terminal of an RS-FF 608, a ½ frequency divider 609, a delay element 610, and a distributor 613.

The output signal 701 of the comparator 605 is a signal produced by pulse frequency modulating the luminance signal. Accordingly, a low frequency component of the output signal 701 of the comparator 605 is the luminance signal, and it can be reproduced from the output of the LPF 607. The output of the LPF 607 is inputted to a horizontal synchronizing circuit 611 and synchronous reproducing circuits 618 and 623.

The horizontal synchronizing circuit 611 receives the luminance signal, and delivers a horizontal synchronizing signal 705 (hereinafter, referred to as an H pulse) which rises at a starting position of the horizontal blanking period or the vertical blanking period, and becomes Hi level during the horizontal synchronizing time period, and repeats at the horizontal synchronizing period. The H pulse is inputted to an enable terminal of a FF 612.

The output signal 702 of the comparator 606 contains a color difference signal component, and it is inputted to a reset terminal of the RS-FF 608. The RS-FF 608 is set by a leading edge of the output signal 701 of the comparator 605, and reset by a trailing edge of the output signal 702 of the comparator 606. Accordingly, the output signal 703 of the RS-FF 608 is the original one pulse train signal, that is, the transmitted signal. The signal 703 is inputted to the FF 612 and the distributor 613.

The FF 612 identifies the output signal 703 of the RS-FF 608 by a leading edge of the output signal 704 of the delay element 610 during a period of Hi level of the H pulse 705 which is the input signal to the enable terminal. Furthermore, the FF 612 outputs a Lo level during a period of Lo level of the input signal to the enable terminal. The output signal 707 of the FF 612 contains the identification signal, data signal, and digital sound signal.

The output signal 707 is inputted to a phase control circuit 622 and a switching pulse circuit 623.

The switching pulse circuit 623 output a Hi level signal when a pattern of the identification signal in the output signal 707 of the FF 612 is started, and outputs immediately a Lo level signal after counting N bits (N pieces of data) of the identification signal, data signal, and digital sound signal. The output signal 706 of the switching pulse circuit 623 is inputted to the distributor 613, and the synchronous reproducing circuits 618 and 622.

The ½ frequency divider 609 divides a frequency of the output signal 701 of the comparator 605 to ½ (a half). The ½ frequency divides signal 708 is fed to the distributor 613. The distributor 613 outputs at an output terminal A thereof, the output signal 703 of the RS-FF 608 when the output signal 706 of the switching pulse circuit 623 is at a Lo level and also the output signal 708 of the ½ frequency divider 609 is at a Hi level, and outputs at the output terminal A, a low level signal when the output signal 706 of the switching pulse circuit 623 is at a Lo level and also the output signal 708 of the ½ frequency divider 609 is at a Lo level. Furthermore, the distributor 613 outputs at an output terminal B thereof, the output signal 703 of the RS-FF 608 when the output signal 706 of the switching circuit 623 is at the Lo level and also the output signal 708 of the ½ frequency divider 609 is at the Lo level, and outputs at the output terminal B a Lo level signal when the output signal 706 of the switching pulse circuit 623 is at the Lo level and also the output signal 708 of the ½ frequency divider 609 is at the Hi level.

Here, during the period of Hi level of the switching pulse circuit 623, the distributor 613 outputs at the output terminal A, a logical product (AND) of the output signal 701 of the comparator 605 and the output signal 708 of the ½ frequency divider 609, and outputs at the output terminal B, a logical product (AND) of the output signal 701 of the comparator 605 and an inverted signal of the output signal 708 of the ½ frequency divider 609. By this processing, it is possible to maintain the color difference signals in the horizontal blanking period or the vertical blanking period at a constant level during demodulation (described later) of the color difference signals. When this processing is not carried out, and when the identification signal, data signal, and digital sound signal occupy substantially the horizontal blanking period or the vertical blanking period, the binary PWM signal components of the identification signal, data signal, and digital sound signal may affect a clamp time period or a video signal time period during demodulation of the color difference signals.

The output signal 709 at the output terminal A of the distributor 613 is inputted to a sawtooth wave generating circuit 614 and a sample holding circuit 615. The sawtooth generating circuit 614 generates a sawtooth wave voltage 710 which rises from a time point at which the input signal becomes Hi level and returns to an initial value when the input signal becomes Lo level. The sawtooth wave voltage 710 is inputted to the sample holding circuit 615.

The sample holding circuit 615 sample holds the sawtooth wave voltage 710 by the trailing edge of the output signal 709 at the output terminal A of the distributor 613, and is reset by the leading edge of the output signal 709 at the output terminal A of the distributor 613. Since the color difference signals have been pulse width modulated (PWM) on the basis of the pulse frequency modulated (PFM) luminance signal, the interval between the set and the reset contains a component of the pulse frequency modulated (PFM) luminance signal. Accordingly, a low frequency component of the output signal 711 of the sample holding circuit 615 contains the color difference signals superposed with the luminance signal. The output signal 711 of the sample holding circuit 615 is inputted to an adder 616.

The adder 616 adds to the output of the sample holding circuit 615 a negative polarity luminance signal of the same constant quantity as the luminance signal contained in the output signal 711 of the sample holding circuit 615. The output of the adder 616 is inputted to an LPF 617. The output of the LPF 617 is the color difference signals containing no synchronizing signal. In this case, a part of a horizontal synchronizing signal or a vertical synchronizing signal in the color difference signals is at a constant level. Accordingly, it is necessary to reproduce the horizontal synchronizing signal or the vertical synchronizing signal.

The output of the LPF 617 is inputted to a synchronous reproducing circuit 618. The synchronous reproducing circuit 618 clamps the output signal of the LPF 617 and the output signal of the LPF 607 to make pedestal potentials of both the output signals coincide to each other, and delivers the output signal of the LPF 617 during a period of Lo level of the switching pulse, and delivers the output signal of the LPF 607 during a period of Hi level of the switching pulse. As a result, the color difference signals added with the synchronizing signal can be reproduced.

Also, from the signal at the output terminal B of the distributor 613, it is possible to obtain the color difference signals added with the synchronizing signal from the output of a synchronous reproducing circuit 623 in a similar way as to the signal at the output terminal A.

The phase control circuit 622 counts the number of bits N (number of pieces of data) from the start of the pattern of the identification signal outputted from the FF 612 until the data signal and the digital sound signal are finished, and then controls the phase of the ½ frequency divider 609 to become Hi level. Here, since the pulse width modulated signal transmitted just after the transmission of the digital sound signal is set, at the time of transmission of the Pr signal, it is possible to determine the output signal of the synchronous reproducing circuit 618 as being the Pr signal by controlling the phase as mentioned above.

As described in the foregoing, in this system, by differentiating the received signal in a minute signal condition and by removing the DC component, it is possible to make easy the amplification at a later stage. Furthermore, by controlling the gain after the received signal has been differentiated and amplified, it is possible to control the gain accurately. Moreover, by differentiating at the time of reception, it is possible to separate into the luminance signal and the color difference signals easily. Furthermore, due to the fact that before the demodulation of the color difference signals, the pulse width of the identification signal, data signal, and digital sound signal which have been binary pulse width modulated during the horizontal blanking period or vertical blanking period is made constant, it is possible to prevent the binary PWM signal components of these identification signal, data signal, and digital sound signal from influencing the clamp time period and the video signal time period during demodulation of the color difference signals. As a result, the color difference signals can be reproduced satisfactorily.

Figure 8:
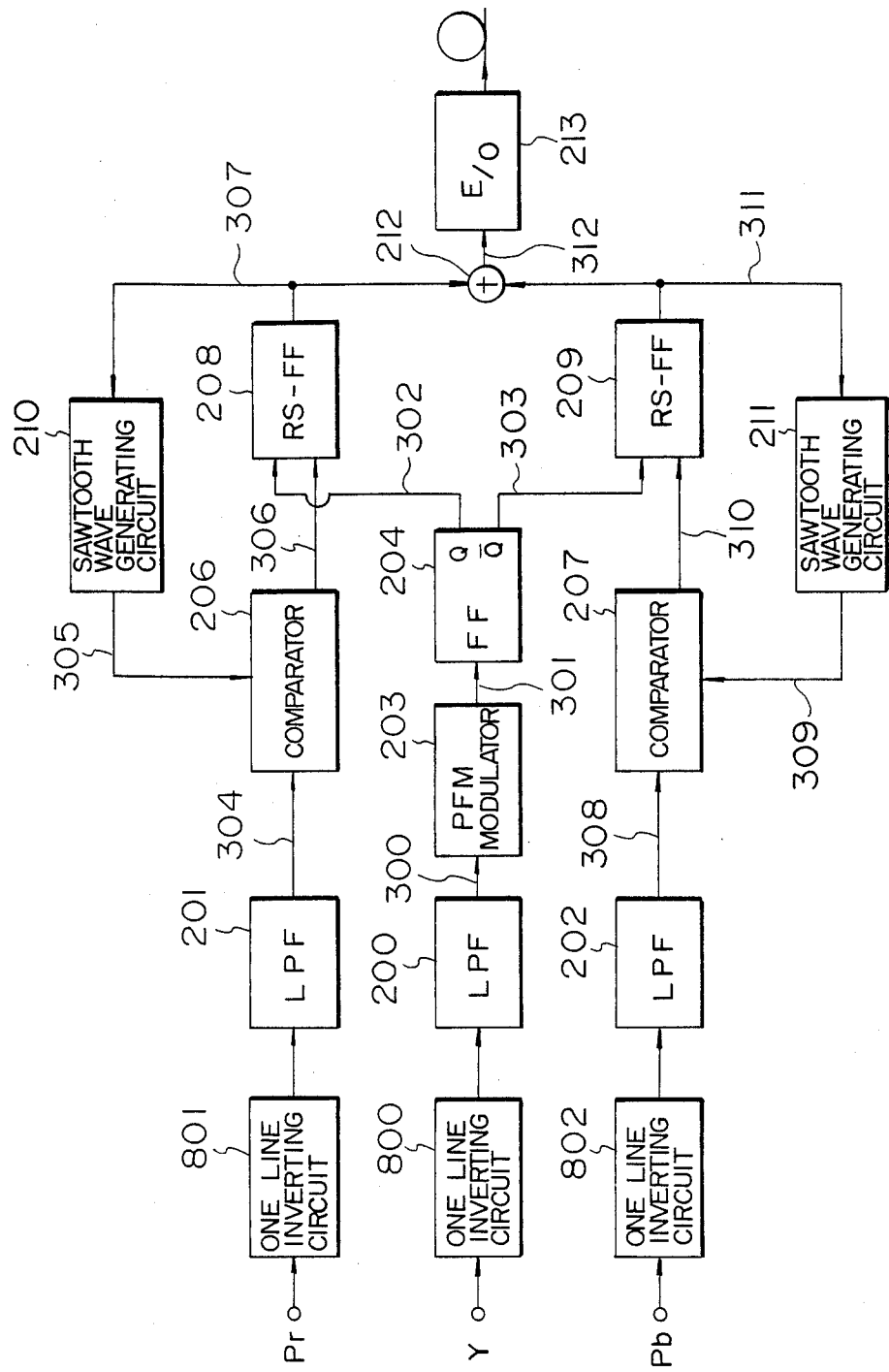
FIG. 8 is a block diagram showing a third embodiment of the present invention.

A third embodiment will be described with reference to FIG. 8. In FIG. 8, identical parts to those in FIGS. 2 and 3 are designated by identical numerals and explanations thereof are omitted.

A luminance signal and two color difference signals including a Pr signal and a Pb signal in a component video signal are respectively inputted to one-line inverting circuits 800, 801, and 802. The one-line inverting circuits 800, 801, and 802 respectively invert line by line the luminance signal, Pr signal, and Pb signal. The outputs of the one-line inverting circuits 800, 801, and 802 are respectively inputted to LPF 200, 201, and 202.

By transmitting the luminance signal and the two color difference signals including the Pr signal and Pb signal in the component video signal after inverting line by line, it is possible to reduce a variation in a DC component in a pulse train signal for each line of the transmitted signal. Accordingly, even when an interference occurs between waveforms due to limitation of a band of a transmission line and the like, it is possible to reduce the interference in each line. Thus, satisfactory transmission can be achieved.

The foregoing description of an embodiment of the invention has been presented for purposes of illustration and description and is not intended to be exhaustive or to limit the invention to the precise forms disclosed, since many modifications and variations are possible in light of the above teachings. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

What is claimed is:

1. A signal transmission method comprising the steps of:
    pulse frequency modulating a luminance signal in a component video signal including the luminance signal and two color difference signals;
    pulse width modulating said pulse frequency modulated signal sequentially by said two color difference signals alternately to form one pulse train signal; and
    transmitting said component video signal in form of said one pulse train signal.

2. A signal transmission method comprising the steps of:
    pulse frequency modulating a luminance signal in a component video signal including the luminance signal and two color difference signals;
    pulse width modulating said pulse frequency modulated signal sequentially by said two color difference signals alternately to form one pulse train signal;
    transmitting said component video signal in form of said one pulse train signal;
    processing said one pulse train signal upon receiving the same to amplify after differentiation; and
    demodulating said component video signal.

3. A signal transmission method comprising the steps of:
    pulse frequency modulating a luminance signal in a component video signal including the luminance signal and two color difference signals;
    pulse width modulating said pulse frequency modulated signal sequentially by said two color difference signals alternately to form one pulse train signal;
    transmitting said component video signal in form of said one pulse train signal;
    processing said one pulse train signal upon receiving the same to amplify after differentiation;
    controlling a gain of said amplified signal automatically; and
    demodulating said component video signal.

4. A signal transmission method comprising the steps of:
    pulse frequency modulating a luminance signal in a component video signal including the luminance signal and two color difference signals;
    pulse width modulating said pulse frequency modulated signal sequentially by said two color difference signals alternately;
    with respect to a part of said component video signal within a horizontal blanking period or a vertical blanking period, binary pulse modulating said pulse frequency modulated signal by a data signal compressed with respect a time base, a digital signal compressed with respect to the time base, and an identification signal indicating positions of said data signal and said digital sound signal thereby to form one pulse train signal; and
    transmitting said component video signal, said data signal, and said sound signal.

5. A signal transmission method comprising the steps of:
    pulse frequency modulating a luminance signal in a component video signal including the luminance signal and two color difference signals;
    pulse width modulating said pulse frequency modulated signal sequentially by said two color difference signals alternately;
    with respect to a part of said component video signal within a horizontal blanking period or a vertical blanking period, binary pulse modulating said pulse frequency modulated signal by a data signal compressed with respect to a time base, a digital signal compressed with respect to the time base, and an identification signal indicating positions of said data signal and said digital sound signal thereby to form one pulse train signal;
    transmitting said one pulse train signal;
    processing said one pulse train signal upon receiving the same to amplify after differentiation; and
    demodulating said component video signal, said data signal, and said sound signal.

6. A signal transmission method comprising the steps of:
    pulse frequency modulating a luminance signal in a component video signal including the luminance signal and two color difference signals;
    pulse width modulating said pulse frequency modulated signal sequentially by said two color difference signals alternately;
    with respect to a part of said component video signal within a horizontal blanking period or a vertical blanking period, binary pulse modulating said pulse frequency modulated signal by a data signal compressed with respect a time base, a digital signal compressed with respect to the time base, and an identification signal indicating positions of said data signal and said digital sound signal thereby to form one pulse train signal;
    transmitting said one pulse train signal;
    processing said one pulse train signal upon receiving the same to amplify after differentiation;
    controlling a gain of said amplified signal automatically; and
    demodulating said component video signal, said data signal, and said sound signal.

7. A signal transmission system for transmitting a component video signal including a luminance signal and two color difference signals, comprising:
- means for pulse frequency modulating said luminance signal; and
- means for pulse width modulating said pulse frequency modulated signal sequentially by said two color difference signals alternately to form one pulse train signal.

8. A signal transmission system for transmitting a component video signal including a luminance signal and two color difference signals, comprising:
- means for pulse frequency modulating said luminance signal;
- means for pulse width modulating said pulse frequency modulated signal sequentially by said two color difference signals alternately to form one pulse train signal;
- means for transmitting said one pulse train signal; and
- means for processing said one pulse train signal by amplifying said one pulse train signal after differentiation thereof at the time of reception of said one train pulse signal.

9. A signal transmission system for transmitting a component video signal including a luminance signal and two color difference signals, comprising:
- means for pulse frequency modulating said luminance signal;
- means for pulse width modulating said pulse frequency modulated signal sequentially by said two color difference signals alternately to form one pulse train signal;
- means for transmitting said one pulse train signal; and
- means for processing said one pulse train signal by amplifying said one pulse train signal after differentiation thereof at the time of reception of said one train pulse signal; and
- means for controlling a gain of said amplified signal automatically.

10. A signal transmission system for transmitting a component video signal including a luminance signal and two color difference signals, a data signal compressed with respect to a time base, and a digital sound signal compressed with respect to the time base, comprising:
- means for pulse frequency modulating said luminance signal;
- means for pulse width modulating said pulse frequency modulated signal sequentially by said two color difference signals alternately;
- means, with respect to a part of said component video signal within a horizontal blanking period and a vertical blanking period, for binary pulse width modulating said pulse frequency modulated signal by said data signal, said digital sound signal, and an identification signal indicating positions of said data signal and said digital sound signal to form one pulse train signal.

11. A signal transmission system for transmitting a component video signal including a luminance signal and two color difference signals, a data signal compressed with respect to a time base, and a digital sound signal compressed with respect to the time base, comprising:
- means for pulse frequency modulating said luminance signal;
- means for pulse width modulating said pulse frequency modulated signal sequentially by said two color difference signals alternately;
- means, with respect to a part of said component video signal within a horizontal blanking period and a vertical blanking period, for binary pulse width modulating said pulse frequency modulated signal by said data signal, said digital sound signal, and an identification signal indicating positions of said data signal and said digital sound signal to form one pulse train signal;
- means for transmitting said one pulse train signal; and
- means for processing said one pulse train signal to amplify after differentiating said one pulse train signal.

12. A signal transmission system for transmitting a component video signal including a luminance signal and two color difference signals, a data signal compressed with respect of a time base, and a digital sound signal compressed with respect to the time base, comprising:
- means for pulse frequency modulating said luminance signal;
- means for pulse width modulating said pulse frequency modulated signal sequentially by said two color difference signals alternately;
- means, with respect to a part of said component video signal within a horizontal blanking period and a vertical blanking period, for binary pulse width modulating said pulse frequency modulated signal by said data signal, said digital sound signal, and an identification signal indicating positions of said data signal and said digital sound signal to form one pulse train signal;
- means for transmitting said one pulse train signal;
- means for processing said one pulse train signal to amplify after differentiating said one pulse train signal; and
- means for controlling a gain of said amplified signal automatically.

13. A color difference signal identification method comprising the steps of:
- pulse frequency modulating a luminance signal in a component video signal including said luminance signal and two color difference signal;
- pulse width modulating said pulse frequency modulated signal sequentially by said two color difference signals alternately;
- with respect to a part of said component video signal within a horizontal blanking period and a vertical blanking period, binary pulse width modulating said pulse frequency modulated signal by said data signal, said digital sound signal, and an identification signal indicating positions of said data signal and said digital sound signal;
- setting as a first color difference signal the pulse width modulated signal which is sent just after the transmission of said identification signal, said data signal, and said digital sound signal;
- transmitting said component video signal in form of one pulse train signal;
- upon receiving said one pulse train signal, identifying said first color difference signal and a second color difference signal by counting the number of bits of said identification signal, said data signal, and said digital sound signal.

14. A signal processing method comprising the steps of:

pulse frequency modulating a luminance signal in a component video signal including said luminance signal and two color difference signal;

pulse width modulating said pulse frequency modulated signal sequentially by said two color difference signals alternately;

with respect to a part of said component video signal within a horizontal blanking period and a vertical blanking period, binary pulse width modulating said pulse frequency modulated signal by a data signal compressed with respect to a time base, a digital sound signal compressed with respect to the time base, and an identification signal indicating positions of said data signal and said digital sound signal to form one pulse train signal;

transmitting said one pulse train signal;

processing said one pulse train signal to amplify after differentiating said one pulse train signal; and with respect to the part of said horizontal blanking period or said vertical blanking period, demodulating the color difference signals after making a pulse width of said binary pulse width modulated pulse train signal.

15. A signal transmission method comprising the steps of:

inverting each signal of a component video signal including a luminance signal and two color difference signals line by line;

pulse frequency modulating said luminance signal inverted line by line;

pulse width modulating said pulse frequency modulated signal sequentially by said two color difference signals inverted line by line thereby to form one pulse train signal; and transmitting said component signal.

* * * * *